United States Patent [15] 3,686,751
Sugiyama [45] Aug. 29, 1972

[54] METHOD OF MANUFACTURING A MAGNETIC HEAD

[72] Inventor: Keiji Sugiyama, Yamanashi, Japan

[73] Assignee: Pioneer Electronic Corporation, Tokyo, Japan

[22] Filed: May 25, 1970

[21] Appl. No.: 40,140

[30] Foreign Application Priority Data

May 23, 1969 Japan ......................44/40469

[52] U.S. Cl. ..........................29/603, 179/100.2 CH
[51] Int. Cl. ............................G11b 5/42, H01f 7/06
[58] Field of Search ...............29/603; 179/100.2 C, 100.2 CH; 340/174.1 F; 346/74 MC

[56] References Cited

UNITED STATES PATENTS

| | | | |
|---|---|---|---|
| 2,756,280 | 7/1956 | Rettinger | 179/100.2 C |
| 2,900,451 | 8/1959 | Havstad | 179/100.2 CH |
| 3,149,407 | 9/1964 | Stockton et al | 29/603 |
| 3,400,386 | 9/1968 | Sinnott | 29/603 |
| 3,411,202 | 11/1968 | Schwartz | 29/603 |

*Primary Examiner*—John F. Campbell
*Assistant Examiner*—Carl S. Hall
*Attorney*—Sughrue, Rothwell, Mion, Zinn & Macpeak

[57] ABSTRACT

A requisite number of bezels or recesses in a non-permeable substance holding member, for example, a ceramic glass, are filled with magnetic chips, and the non-permeable substance is crystallized or sintered. In process of crystallizing or sintering, the non-permeable substance contracts and firmly holds the magnetic chips. Preferably, some glaze is previously put in the gap between a wall of the bezel and the chip. Magneto-electric converting means, for example, a Hall element, is vapor deposited onto each chip and aligned so as to correspond with each track of a magnetic tape. And then the other non-permeable substance holding member which holds one or more magnetic substance chips with, correspondingly, the magneto-electric converting means is united with the above-mentioned non-permeable substance holding member in order that each magneto-electric converting means is positioned in a gap between the corresponding chips, and a magnetic circuit is formed.

10 Claims, 5 Drawing Figures

INVENTOR.
KEIJI SUGIYAMA
BY Sughrue, Rothwell, Mion,
Zinn & Macpeak
ATTORNEYS

METHOD OF MANUFACTURING A MAGNETIC HEAD

BACKGROUND OF THE INVENTION

1. Field of the Invention

This invention relates generally to a magnetic head for use with magnetic recording and reproducing equipment, and more particularly to a magnetic head wherein a plurality of magneto-electric converting means are formed by evaporation.

2. Description of the Prior Art

Recent efforts to increase the amount of information storage per unit area of magnetic tape involves providing multiple tracks such as four or eight tracks on one magnetic tape. In order to provide multiple tracks within a certain width of the magnetic tape, the front recording portion of the magnetic head must be flattened so as not to affect the adjacent tracks so that the gaps therebetween should be sufficiently small enough to be within the width of the track corresponding thereto.

Heretofore, so-called ring shape magnetic material is wound by a coil for a multi-channel magnetic head used by the following two methods: The first method involves the steps of providing the required number of gap portions within one magnetic head and electrically selecting either gap portion whether to record to reproduce the information while the second method involves the steps of providing one or two gap portions within on magnetic head and recording or reproducing the multiple tracks on the magnetic tape by vertically moving the magnetic head itself.

It is, however, extremely difficult to manufacture by the first method because where multiple coils are provided in one magnetic head, it introduces an increase of cross-talk unless the magnetic head is moved elevationally with considerable accuracy by the second method.

Further, the mechanism of elevationally moving the magnetic head prevents making the magnetic recording and reproducing equipment compact and light.

On the other hand, in order to eliminate these disadvantages of such magnetic heads, there exists a semiconductor magnetic head using a magneto-electric converting element such as a Hall element, so that the magnetic head may be made extremely compact in a generating mechanism which is preferable for multichannel magnetic heads. However, the magnetic head using the magneto-electric converting element has many disadvantages as follows: That is, at first, the many Hall elements must b-e disposed with accuracy so as to correspond accurately to each track of a magnetic tape. Secondly, a plurality of magnetic circuits comprised of high permeable material must be correspondingly arranged to each track and a Hall element must be held in a gap of each magnetic circuit so that magnetic signals which are recorded in the magnetic tape may pass through the Hall elements. Thirdly, the gap of the magnetic circuit should be narrow to the utmost so as to allow the frequency characteristics of the head to improve in the high frequency range. Therefore, it is necessary that the Hall element be a very thin film. Fourthly, a holding member is necessary with a plurality of high permeable material held in a proper position. The holding member must be endowed with hardness and smoothness in order to endure the running contact of the magnetic tape.

As for the fifth disadvantage, a powerful binding agent, which has little aging, is necessary so as to bind the high permeable materials within the holding member. Sixthly, if the Hall elements are formed by evaporation on each surface forming the gap portion of the high permeable materials, which are, in turn, held within the holding member, to solve the above-mentioned first and third problems, the elements may be formed thin and accurate in dimensions, but the binding agent is unequal to the high temperature of the evaporation; therefore, such magnetic heads have not been put to practical use.

SUMMARY OF THE INVENTION

It is, therefore, one object of the invention to provide a novel and improved magnetic head which eliminates the aforementioned disadvantages of the conventional magnetic head using an electro-converting element which employs the advantages described previously.

It is another object of the invention to provide a multi-channel magnetic head which highly restrains the cross-talk between the respective channel.

The other objects, features and advantages of the present invention will become apparent from the following description with accompanying drawings.

BRIEF DESCRIPTION OF THE DRAWINGS

The drawings show the manufacturing process of the magnetic head of the invention.

DESCRIPTION OF THE PREFERRED EMBODIMENT

Figure 1:
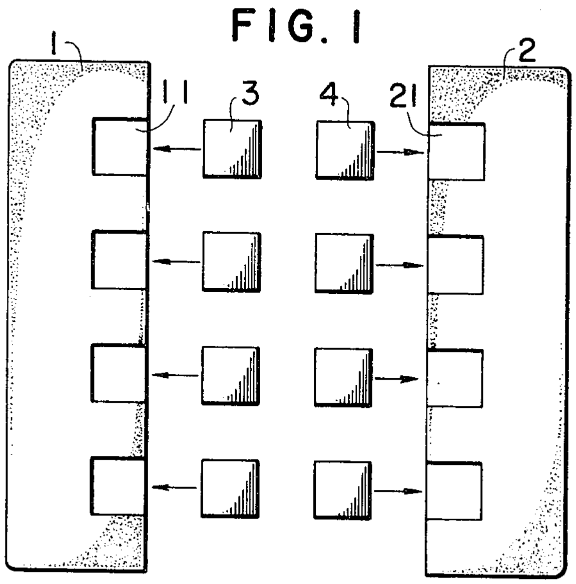
FIG. 1 is a front exploded view of the magnetic head at the initial step of manufacturing the head in which magnetic chips are not yet put into bezels acting as a holding member.
Figure 2:
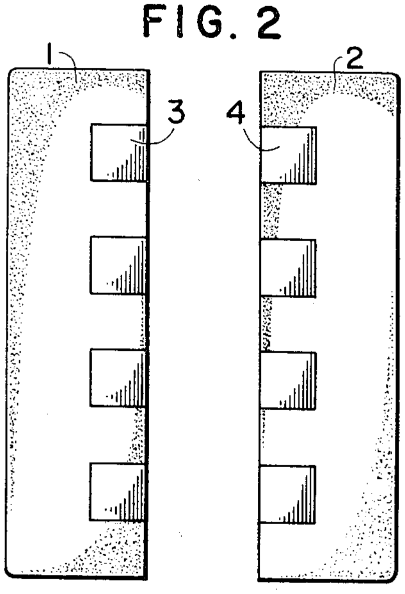
FIG. 2 is a front view of the magnetic head at the next step of manufacturing the head in which said magnetic chips are within the bezels.

Referring now to the drawings, in FIG. 1, 1 and 2 indicate holding members which are made of non-permeable substance, for example, a ceramic glass having contractibility in the process of crystallizing, or other ceramic materials having contractibility in the process of sintering. 11 and 21 indicate bezels or recesses which are formed in the holding members 1 and 2 before the crystallizing or the sintering, so that they may correspond with each track of a magnetic tape after being crystallized or sintered. 3 and 4 indicate magnetic chips which are made of a high permeable magnetic substance, for example, a ferrite, and which are formed slightly smaller than the bezels so as to be put into the bezels. The magnetic chip 3 is put into the bezel 11 and the magnetic chip 4 is put into the bezel 21, as shown in FIG. 2. After putting the magnetic chips 3 and 4, the holding members 1 and 2 are crystallized or sintered so as to contract and hold the chips firmly.

Figure 3:
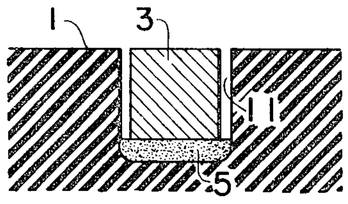
FIG. 3 is a sectional view of one portion of the bezel illustrating the situation in which the magnetic chip is placed therein with some glaze.

If the contracting rate of the holding members 1 and 2 is too large and the magnetic chips 3 and 4 are compressed too strong, the magnetic chips 3 and 4 will crack. FIG. 3 is a sectional view to show a method to prevent such problem.

When the magnetic chip 3 is put into the bezel 11 of the holding member 1, a glaze 5 which melts at a lower temperature than the crystallizing or sintering temperature of the holding member 1, (for example, powder of ceramic glass which is melted by the comparatively low temperature) is put into the bezel 11. If the magnetic chip 3 is formed slightly smaller than the volume of the bezel which is not yet crystallized or sintered, the melted glaze 5 permeates the gap between the holding member 1 and the magnetic chip 3, just before the holding member 1 begins to crystallize or sinter.

Further, if the holding member 1 is crystallized or sintered under a vacuum, bubbles do not remain in the gap and improvement in the quality of the magnetic head is obtained.

It is very difficult to accurately form the bezel 11 in cubic in the holding member 1, but by using the glaze 5, the problem may be resolved. That is, the corner of the bottom of the bezel 11, as shown in FIG. 3, may be rounded.

Figure 4:
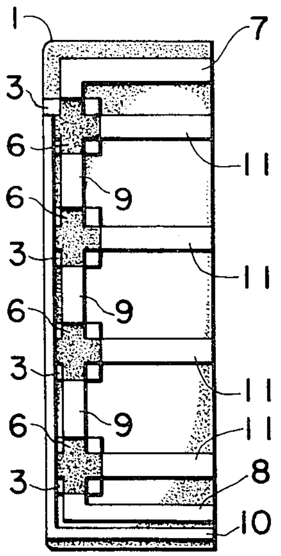
FIG. 4 is a right side view of the holding member shown in FIG. 1 during the manufacturing step in which magneto-electric converting means and leads are formed by evaporation.

FIG. 4 is a right side view of the holding member 1 shown in FIG. 2. In case that the holding member 1, the magnetic chip 3 and the glaze 5 are non-conductive materials, a Hall element 6 in film form is directly formed onto the magnetic chip 3 by evaporation of, for example, indium antimonide (In Sb). In case only one of them is conductive material, the Hall element 6 must be formed over an insulating thin film. 7 and 8 indicate terminals, formed by evaporation, which supply a control current to the Hall element 6.

A lead 9 connects the Hall elements 6 to each other in series. 10 indicates a common ground for each Hall element 6. 11 indicates a terminal for the out-put voltage of each Hall element 6. An out-put signal is generated by the Hall element 6 according to the magnetic flux led from each track of a recorded magnetic tape and the control current passes to the terminal 7 (or 8), and the signal is led out between the common ground line 10 and each terminal 11. The lead 9, the common ground line and terminals 11 are formed together by evaporation with the terminals 7 and 8.

Hereupon, when a temperature at which the holding member 1 is crystallized or sintered is indicated at T1, another temperature at which the glaze 5 is melted is indicated as T2, and still another temperature at which the Hall element is evaporated is indicated as T3, these materials must be selected so as to be the relation among these temperatures such as $$T1 > T2 > T3$$

Therefore, the glaze 5 is not softened again at the evaporating temperature T3.

Figure 5:
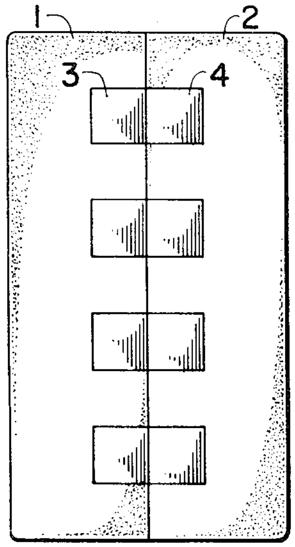
FIG. 5 is a front view of the magnetic head at the step of manufacturing the head in which the right and left holding members shown in FIG. 2 are symmetrically united.

Subsequently, the holding member 2 which holds magnetic chips 4 is united with the other holding member 1 by adequate uniting means, for example, a screw. In case that the holding member 2, the magnetic chips 2 and the glaze 5 are non-conductive material, these two holding members 1 and 2 may be united directly. In case one of them is a conductive material, they must be united through an insulating thin film. Passing through the abovementioned manufacturing process, the Hall elements 6 are completely positioned within a gap of each magnetic circuit comprising the magnetic chips 3 and 4, and are aligned so as to correspond with each track of a magnetic tape. Then, the front face of the magnetic head, shown in FIG. 5, is polished in order to reach an adequate form and smoothness, and then it is put to practical use.

According to this invention, as hereinbefore described, the magnetic chips are positively held with the holding member contracting at the crystallizing or sintering time, and without using a binding agent which is inferior in heat-resisting.

Therefore, the magnetic chips can be firmly held in accurate positions, and the positions are not changed at all even if they are exposed to the evaporating temperature. The Hall elements can be formed at one time by evaporation with thin and accurate measurement so as to correspond with each track of a magnetic tape. The multi-channel head which closely restrains cross-talk between the respective channels is provided. Further, the manufacturing process is excellent for mass production, and the improved multi-channel head is inexpensive to manufacture and solid in construction.

In this description, a Hall element is used as one embodiment of magneto-electric converting means, but it goes without saying that other elements which are similarly effective may be used instead of the Hall element.

What is claimed is:

1. A method of manufacturing a magnetic head comprising the steps of:

providing a recess within a surface of a holding member made of a non-permeable substance which contracts during crystallizing, placing a high permeable magnetic chip formed slightly smaller than the size of the recess within the same, crystallizing the holding member to cause the contracting holding member to firmly hold the high permeable magnetic chip, vapor depositing a magneto-electric converting means onto the high permeable magnetic chip, providing necessary leads and terminals for the chip on the holding member, and uniting the holding member with another aligned holding member which holds a similar high permeable magnetic chip in face abutting, aligned position with the abovementioned chip to form a magnetic circuit.

2. A method of manufacturing a magnetic head comprising the steps of:

providing at least one recess in a holding member which made of non-permeable substance, such as a ceramic glass or a ceramic, which contracts in the process of crystallizing, placing a glaze, which melts at a lower temperature than the crystallizing temperature of the holding member, into the recess, placing a high permeable magnetic chip formed slightly smaller than the volume of the recess with the glaze within the recess, crystallizing the holding member to firmly hold the high permeable magnetic chip, evaporating a magneto-electric converting means onto the high permeable magnetic chip, providing necessary leads and terminals for the chip on the holding member, and uniting the holding member to another holding member which holds a similar high permeable magnetic chip in face abutting, aligned position with the abovementioned chip to form a magnetic circuit.

3. A method of manufacturing a magnetic head as set forth in claim 2, wherein, with the crystallizing temperature T1 of the holding member, the melting temperature T2 of the glaze and the evaporating temperature T3, a relation such as T1 > T2 > T3 exists.

4. A method of manufacturing a magnetic head as set forth in claim 1, wherein said magneto-electric converting means is a Hall element.

5. A method of manufacturing a magnetic head as set forth in claim 2, wherein said magneto-electric converting means is a Hall element.

6. A method of manufacturing a magnetic head comprising the steps of:

providing a recess within a surface of a holding member made of a non-permeable substance which contracts during sintering, placing a high permeable magnetic chip formed slightly smaller than the size of the recess within the same, sintering the holding member to cause the contracting holding member to firmly hold the high permeable magnetic chip, vapor depositing a magneto-electric converting means onto the high permeable magnetic chip, providing necessary leads and terminals for the chip on the holding member, and uniting the holding member with another aligned holding member which holds a similar high permeable magnetic chip in face abutting, aligned position with the abovementioned chip to form a magnetic circuit.

7. A method of manufacturing a magnetic head comprising the steps of:

providing at least one recess in a holding member which is made of a non-permeable substance, such as a ceramic glass of a ceramic, which contracts in the process of sintering, placing a glaze which melts at a lower temperature than the sintering temperature of the holding member, into the recess, placing a high permeable magnetic chip formed slightly smaller than the volume of the recess with the glaze within the recess, sintering the holding member to firmly hold the high permeable magnetic chip, evaporating a magneto-electric converting means onto the high permeable magnetic chip, providing necessary leads and terminals for the chip on the holding member, and uniting the holding member to another holding member which holds a similar high permeable magnetic chip in face abutting, aligned position with the abovementioned chip to form a magnetic circuit.

8. The method of manufacturing a magnetic head as set forth in claim 7, wherein, with the sintering temperature T1 of the holding member, the melting temperature T2 of the glaze and the evaporating temperature T3, a relation such as T1 >T2 >T3 exists.

9. The method of manufacturing a magnetic head as set forth in claim 6, wherein said magneto-electric converting means is a Hall element.

10. The method of manufacturing a magnetic head as set forth in claim 7, wherein said magneto-electric converting means is a Hall element.

* * * * *